(12) United States Patent
Kamath et al.

(10) Patent No.: US 12,136,137 B2
(45) Date of Patent: Nov. 5, 2024

(54) ARTWORK GENERATED TO CONVEY DIGITAL MESSAGES, AND METHODS/APPARATUSES FOR GENERATING SUCH ARTWORK

(71) Applicant: Digimarc Corporation, Beaverton, OR (US)

(72) Inventors: Ajith M. Kamath, Beaverton, OR (US); Fabrice Capiez, Cevrat (FR)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/405,795

(22) Filed: Aug. 18, 2021

(65) Prior Publication Data

US 2022/0036496 A1 Feb. 3, 2022

Related U.S. Application Data

(63) Continuation of application No. PCT/US2020/025420, filed on Mar. 27, 2020.

(60) Provisional application No. 62/824,934, filed on Mar. 27, 2019.

(51) Int. Cl.
*G06T 1/00* (2006.01)
*G06K 7/14* (2006.01)
*H04N 1/32* (2006.01)

(52) U.S. Cl.
CPC .......... *G06T 1/0028* (2013.01); *G06K 7/1443* (2013.01); *H04N 1/32293* (2013.01); *G06T 2201/0061* (2013.01)

(58) Field of Classification Search
CPC ............ G06T 1/0028; G06T 2201/0061; G06T 2201/0051; G06K 7/1443; H04N 1/32293
See application file for complete search history.

(56) References Cited

U.S. PATENT DOCUMENTS

| | | | |
|---|---|---|---|
| 5,649,032 | A | 7/1997 | Burt |
| 6,122,403 | A | 9/2000 | Rhoads |
| 6,137,498 | A | 10/2000 | Silvers |
| 6,532,312 | B1 | 3/2003 | Corkran |
| 6,590,996 | B1 | 7/2003 | Reed |
| 6,614,914 | B1 | 9/2003 | Rhoads |
| 6,665,451 | B1 | 12/2003 | Kusama |

(Continued)

FOREIGN PATENT DOCUMENTS

WO 2020198660 10/2020

OTHER PUBLICATIONS

Kamath. Signal Rich Art: Object Placement, Object Position Modulation and Other Advances, IS&T Int'l Symposium on Electronic Imaging, Jan. 18, 2021.

(Continued)

*Primary Examiner* — Christopher Wait
(74) *Attorney, Agent, or Firm* — Digimarc Corporation

(57) ABSTRACT

2D machine readable symbologies are stylized and made aesthetically-appealing, facilitating their use to convey plural-symbol data on product packaging and other articles. In some arrangements, a symbology is mimicked as a collage of excerpts from a style image (e.g., a photograph or other artwork). To human viewers, the stylized symbology resembles the style image, rather than the 2D symbology. A great variety of other features and arrangements are also detailed.

45 Claims, 12 Drawing Sheets
(5 of 12 Drawing Sheet(s) Filed in Color)

(56) References Cited

U.S. PATENT DOCUMENTS

| | | |
|---|---|---|
| 6,687,419 B1 | 2/2004 | Atkin |
| 6,724,946 B1 | 4/2004 | Kusama |
| 6,975,744 B2 | 12/2005 | Sharma |
| 6,993,152 B2 | 1/2006 | Patterson |
| 7,044,395 B1 | 5/2006 | Davis |
| 7,321,667 B2 | 1/2008 | Stach |
| 8,023,160 B2 | 9/2011 | Monga |
| 8,340,423 B1 | 12/2012 | Zelinka |
| 8,412,577 B2 | 4/2013 | Rodriguez |
| 9,690,967 B1 | 6/2017 | Brundage |
| 9,747,656 B2 | 8/2017 | Stach |
| 9,760,820 B2 | 9/2017 | Lin |
| 9,864,919 B2 | 1/2018 | Reed |
| 9,959,587 B2 | 5/2018 | Sharma |
| 10,242,434 B1 | 3/2019 | Holub |
| 10,496,861 B2 | 12/2019 | Rothschild |
| 10,558,900 B2 | 2/2020 | Zhu |
| 10,621,482 B2 | 4/2020 | Wang |
| 11,037,038 B2 | 6/2021 | Kamath |
| 11,164,059 B2 | 11/2021 | Zhu |
| 11,514,285 B2 | 11/2022 | Kamath |
| 2002/0136429 A1 | 9/2002 | Stach |
| 2003/0001858 A1 | 1/2003 | Jack |
| 2004/0022444 A1 | 2/2004 | Rhoads |
| 2004/0022453 A1 | 2/2004 | Kusama |
| 2004/0047518 A1 | 3/2004 | Tiana |
| 2005/0047651 A1 | 3/2005 | Zheng |
| 2005/0147322 A1 | 7/2005 | Saed |
| 2005/0207615 A1 | 9/2005 | Stach |
| 2011/0050723 A1 | 3/2011 | Tokunaga |
| 2011/0058736 A1 | 3/2011 | Tokunaga |
| 2011/0103683 A1 | 5/2011 | Tokunaga |
| 2011/0214044 A1 | 9/2011 | Davis |
| 2011/0268369 A1 | 11/2011 | Richards |
| 2015/0262335 A1 | 9/2015 | Padwick |
| 2015/0324946 A1* | 11/2015 | Arce ............... G06T 1/0007 382/251 |
| 2016/0364623 A1 | 12/2016 | Evans |
| 2017/0024840 A1 | 1/2017 | Holub |
| 2017/0249491 A1 | 8/2017 | Macintosh |
| 2019/0139176 A1 | 5/2019 | Stach |
| 2019/0171856 A1 | 6/2019 | Sharma |
| 2019/0213705 A1 | 7/2019 | Kamath |
| 2019/0266749 A1 | 8/2019 | Rhoads |
| 2019/0306385 A1 | 10/2019 | Sharma |
| 2019/0332840 A1 | 10/2019 | Sharma |
| 2019/0378235 A1 | 12/2019 | Kamath |
| 2020/0311505 A1 | 10/2020 | Kamath |

OTHER PUBLICATIONS

Kamath, Hiding in Plain Sight: Enabling the Vision of Signal Rich Art, IS&T Int'l Symposium on Electronic Imaging, Jan. 2019.
Kamath, Signal Rich Art: Improvements and Applications, presentation at Electronic Imaging Conference, Jan. 27, 2020.
International Search Report and Written Opinion for App. No. PCT/US2020/025420, dated Sep. 7, 2020, 19 pages.
Photographic Mosaic, Wikipedia article, Jan. 10, 2019.
Hunt, PhotoTiled Pictures, 2004.
International Preliminary Report on Patentability and Written Opinion for App. No. PCT/US2020/025420, dated Sep. 28, 2021, 11 pages.

* cited by examiner

STYLE IMAGE
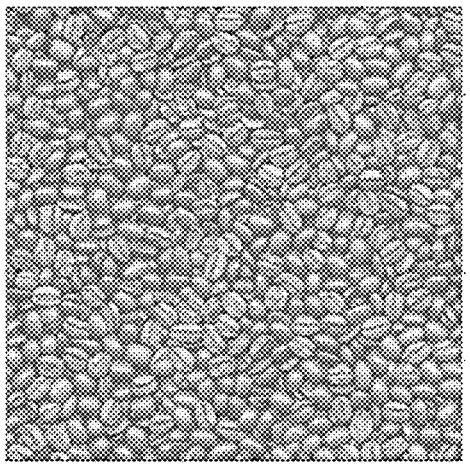
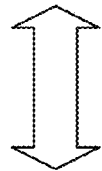
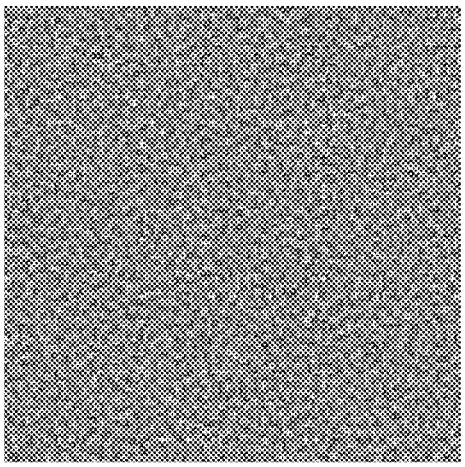
WATERMARK SIGNAL BLOCK
COLLAGE IMAGE
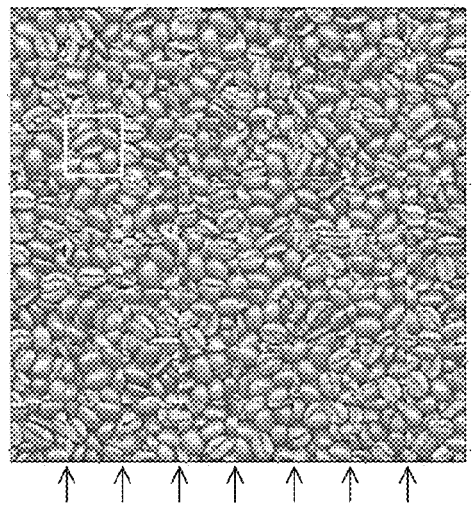
FIG. 4

```
clear all;%close all
%% Prepare image
im = imread('circles.tif');
im = imresize(im,[256,256]);
image = mean(double(im),3); % convert to gray-scale and double
figure(1);subplot(121); imshow(uint8(image));title('Style Image')

bkSize = 20; % patchwork block size

%% Vectorize style image blocks
y = im2col(image,[bkSize bkSize]); % convert to 8x8 blocks, each block in column
mx = mean(y); % calculate mean and save it for further processing
B = y - mx;   % zero-mean variable % Vectorize watermark signal blocks
imwm = double(imresize(imread('GP_tile.png'),floor(256/bkSize)*bkSize/512)); % load image
xb = im2col(imwm,[bkSize bkSize],'distinct'); % convert to 8x8 *non-overlapping* blocks, each block in column
xmx = mean(xb); % calculate mean and save it for further processing
x = xb - xmx;   % zero-mean variable %% Correlate and construct collage
beta = 40; % relative weight of correlation and T.V. metric
xo = zeros(size(x)); % output image
```

FIG. 9A

```
% edge vector buffer for T.V. metric
ledge = 127*ones(floor(size(imwm,1)/bkSize), bkSize);

for ii = 1:floor(size(imwm,2)/bkSize)
    tedge = 127*ones(1,bkSize);
    for jj = 1:floor(size(imwm,1)/bkSize)
        bidx = (ii-1)*floor(size(imwm,1)/bkSize) + jj; % signal block index
        edgetv = sum(abs(y(1:bkSize:end,:)-tedge'))+sum(abs(y(1:bkSize,:)-ledge(jj,:)')); % T.V. metric
        metric = B'*x(:,bidx) - beta*edgetv';
        [my,myi] = max(metric); % co-ordinates of best style image block
        xo(:,bidx) = y(:,myi);
        tmp = reshape(xo(:,bidx),bkSize,bkSize);
        ledge(jj,:) = tmp(:,end); % update edge vector buffer
        tedge = tmp(end,:);
    end
end
%%% Restore and plot
figure(1)
subplot(122)
% Reshape vectors to image blocks
oim = col2im(xo,[bkSize bkSize],[fix(size(imwm,1)/bkSize)*bkSize fix(size(imwm,2)/bkSize)*bkSize],'distinct');
imshow(uint8(oim));colormap gray; axis image
title('Collage')
```

FIG. 9B

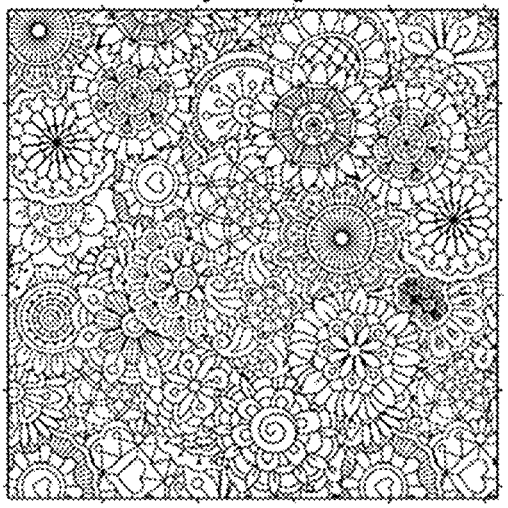
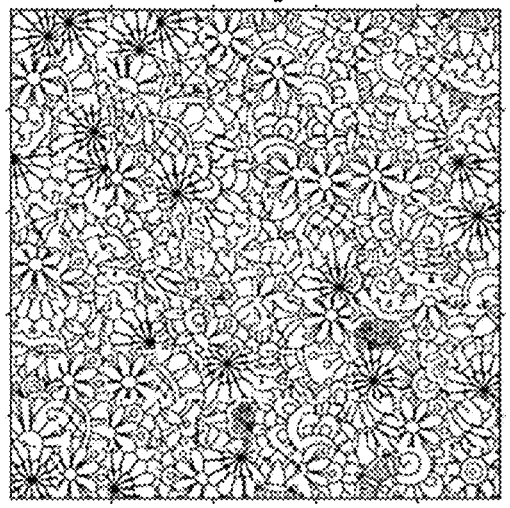
FIG. 10
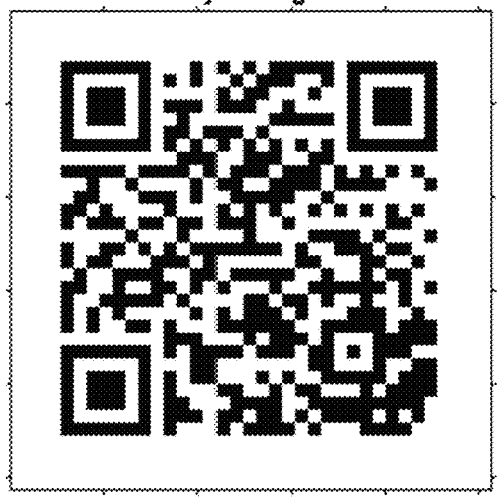
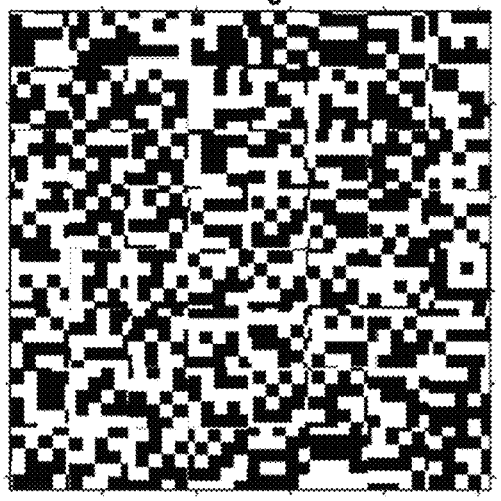
FIG. 11

ARTWORK GENERATED TO CONVEY DIGITAL MESSAGES, AND METHODS/APPARATUSES FOR GENERATING SUCH ARTWORK

RELATED APPLICATION DATA

This application is a continuation of copending PCT application PCT/US2020/025420, filed Mar. 27, 2020 (published as WO2020198660), which claims priority to application 62/824,934, filed Mar. 27, 2019.

The subject matter of this application is generally related to that of U.S. application Ser. No. 15/072,884, filed Mar. 17, 2016 (published as US20170024840), Ser. No. 16/129,487, filed Sep. 12, 2018 (published as US20190139176), Ser. No. 16/002,989, filed Jun. 7, 2018 (published as US20190171856), Ser. No. 16/212,125, filed Dec. 6, 2018 (published as US20190213705), and Ser. No. 16/435,164, filed Jun. 7, 2019 (published as US20190378235). The artisan is presumed to be familiar with such related art.

TECHNICAL FIELD

The present technology concerns message signaling. The technology is illustrated in the context of message signaling through artwork of grocery item packaging, to convey plural-bit messages—of the sort presently conveyed by UPC barcodes. However, the technology is not so-limited.

BACKGROUND AND INTRODUCTION

Barcodes are in widespread use on retail items, but occupy real estate that the manufacturers would prefer to use for other purposes. Some retail brands find that printing a barcode on a product detracts from its aesthetics.

Steganographic digital watermarking is gaining adoption as an alternative to visible barcodes. Watermarking involves making subtle changes to packaging artwork to convey a multi-bit product identifier or other message. These changes are generally imperceptible to humans, but are detectable by a computer.

FIGS. 1A and 1B shows illustrative digital watermark patterns, including magnified views depicting their somewhat mottled appearance. In actual use, the watermark pattern is scaled-down in amplitude so that, when overlaid with packaging artwork in a tiled fashion, it is an essentially transparent layer that is visually imperceptible amid the artwork details—just slightly altering local image luminance or chrominance.

Designing watermarked packaging involves establishing a tradeoff between this amplitude factor, and detectability. To assure reliable detection—even under the adverse imaging conditions that are sometimes encountered by supermarket scanners—the watermark should have as strong an amplitude as possible. However, the greater the amplitude, the more apparent the pattern of the watermark becomes on the package. A best balance is struck when the watermark amplitude is raised to just below the point where the watermark pattern becomes visible to human viewers of the packaging.

FIG. 2 illustrates this graphically. When a watermark is added to artwork at low levels, human visibility of the watermark is nil. As strength of the watermark increases, there becomes a point at which humans can start perceiving the watermark pattern. Increases in watermark amplitude beyond this point result in progressively greater perception (e.g., from barely, to mild, to conspicuous, to blatant). Point "A" is the desired "sweet-spot" value, at which the amplitude of the watermark is maximum, while visibility of the watermark is still below the point of human perception.

Setting the watermark amplitude to this sweet-spot value, when creating packaging artwork (e.g., using Adobe Illustrator software), is one thing. Hitting this sweet-spot "on-press" is another.

All print technologies, being physical processes, have inherent uncertainty. Some print technologies have more uncertainty than others. Dry offset printing is one; it is notably inaccurate. (Dry offset is advantageous in other respects; for example, it works well with the tapered shapes of plastic tubs, such as for yogurt and sour cream.)

Dry offset offers only gross control of dot size and other print structures. For example, if a digital artwork file specifies that ink dots are to be laid down with a density of 15%, a dry offset press will typically deposit a much greater density of ink, e.g., with 30% density.

Printer profiles exist to characterize such behavior. A profile for a particular model of dry offset press may specify that artwork indicating a 15% density will actually be rendered with a 25% density (e.g., a 10% dot gain). But there is a great deal of variation between presses of the same model—depending on factors including age, maintenance, consumables, temperature, etc. So instead of depositing ink at a 25% density—as indicated by a printer's profile, a particular press may instead deposit ink at a 20% density. Or a 40% density. Or anything in between.

This uncertainty poses a big obstacle for use of digital watermark technology. Packaging artwork that has been carefully designed to set the watermark amplitude to the point "A" sweet-spot of FIG. 2, may instead be printed with the watermark amplitude at point "B", making the watermark plainly visible.

Patent publication US20110214044 teaches that, rather than attempt to hide a digital watermark signal in artwork, the payload data may be encoded as overt elements of the artwork. One example is a digital watermark in which the amplitude is set to a plainly human-visible level. Another example is a 1D or 2D black and white barcode that is used as a fill pattern, e.g., laid down by a paintbrush in Adobe Photoshop software.

These techniques often do not prove satisfactory. As illustrated by FIGS. 1A and 1B, a digital watermark, with its amplitude set to a plainly human-visible level, yields a pattern that does not fit well into the design of most packaging. Painted barcode fills similarly have limited practical utility.

In accordance with one aspect of the technology, a 2D steganographic machine-readable code is stylized by a collage process, based on excerpts copied from one or more artworks. The result no longer has the appearance of the original machine-readable code, yet can be read by a compliant code reading apparatus. Such a code can be tiled and serve as a background for product packaging artwork, e.g., as shown by the coffee bean background in the yogurt label of FIG. 3. Unlike the arrangements detailed in publication US20190213705, the present technology does not require a neural network.

One particular method employing aspects of the present technology includes creating a stylized counterpart to a target image, comprising a 2D machine-readable code, where the target image has an attribute of being decodable by a compliant reader apparatus to produce a plural-symbol payload. Such method more particularly includes identifying component blocks of the target image, where each component block has a respective location within said image, so that an array of P of said component blocks collectively forms a pattern that spans the target image. One or more style images are received, and a similarity comparison is performed between a first of the component blocks of the target image, and plural candidate excerpts within the one or more style images, yielding a set of similarity values—each corresponding to a respective candidate excerpt within a style image. One of the candidate excerpts is selected, based at least in part on its corresponding similarity value. This selected candidate excerpt is copied into a location in an output frame that corresponds to the location of the first component block within the target image. These steps are repeated for second through Pth component blocks of the target image, to fill the output frame with selected excerpts from one or more style images, yielding a stylized counterpart image having the attribute of being decodable by the compliant reader apparatus to produce said plural-symbol payload.

Another illustrative method employing aspects of the present technology involves dividing a target image into a plurality of tile regions, each representing a distinct locus of the target image. For each tile region, plural source images are compared to the tile region to produce similarity measures. The source image with a highest similarity measure is selected to represent the tile region. This selected source image is positioned in the mosaic image at a locus corresponding to the locus of the tile region. The target image is a machine-readable code having an attribute of being readable by a compliant reader apparatus, and fidelity of the mosaic is sufficient for a plural bit payload to be extracted from the mosaic by the compliant reader apparatus.

An illustrative apparatus employing aspects of the present technology comprises first means for determining similarity between an excerpt from a machine-readable code and plural excerpts from one or more style images; second means for assessing edge continuity between said excerpt from the machine-readable code and plural excerpts from one or more style images; and third means for processing data from the first and second means to select excerpts from the one or more style images to compose into a collage corresponding to the machine-readable code.

A still further embodiment employing aspects of the present technology is an article comprising a container with a label, the label being printed with artwork that includes an array of excerpts from one or more style images. Each of the excerpts lacks watermark encoding, but the tiled array collectively defines watermark encoding, where the watermark encoding conveys a plural-symbol identifier for the article.

The foregoing and additional features and advantages of the present technology will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates a style image (depicting coffee beans) and a watermark image, which are processed according to the present technology to generate a coffee bean college that conveys the watermark's payload.

FIGS. 9A and 9B detail Matlab code used in an illustrative embodiment of the present technology.

FIGS. 10, 11 and 12 show style images, and corresponding watermarked collages, in accordance with certain embodiments of the present technology.

DETAILED DESCRIPTION

Figure 1A:
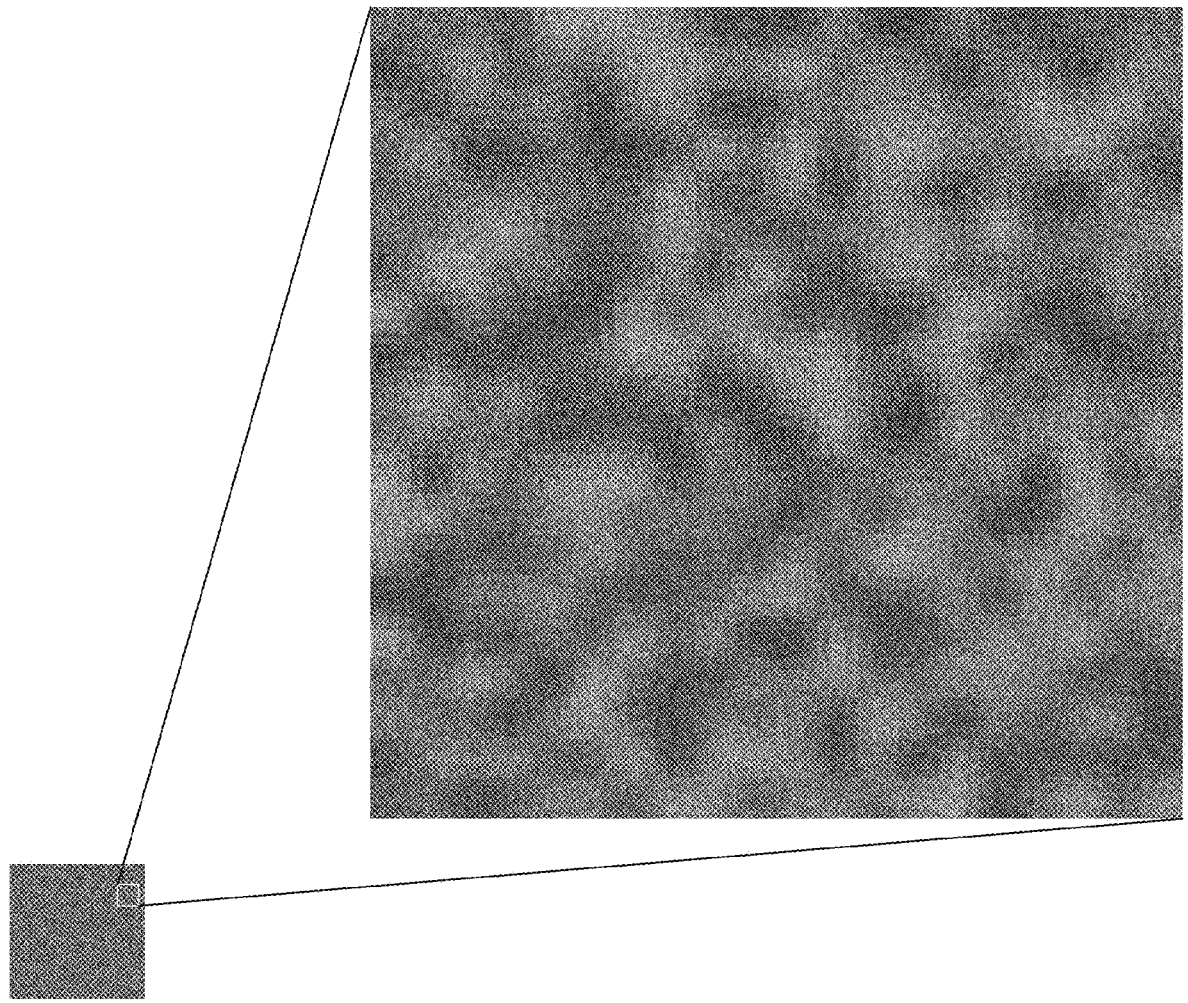
FIGS. 1A and 1B illustrate exemplary digital watermark patterns.
Figure 1B:
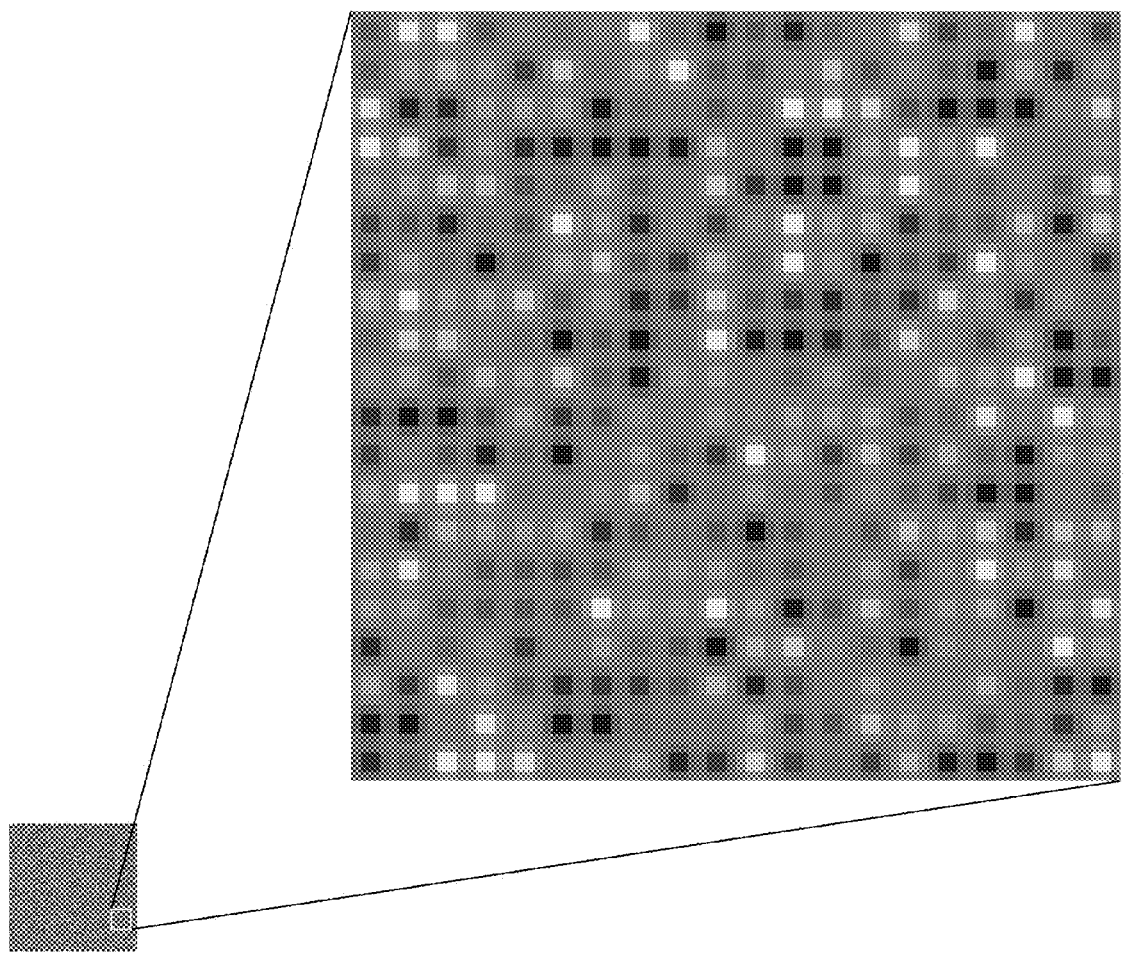
Figure 2:
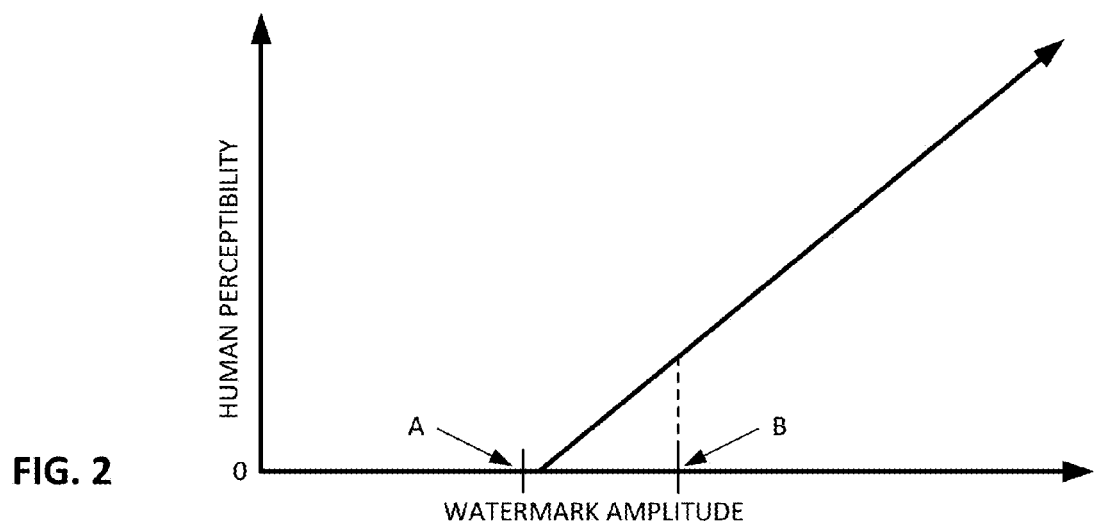
FIG. 2 is a graph showing how a digital watermark is human-imperceptible at low strengths, but becomes progressively more conspicuous at higher strengths.
Figure 3:
FIG. 3 shows artwork for a yogurt container, including a background digital watermark pattern stylized with coffee bean artwork.

An exemplary method according to the present technology produces a stylized version of a steganographic digital watermark signal, based on an input digital watermark signal image (sometimes termed a target image) and one or more style images (sometimes termed source images). The stylized version of the watermark signal is composed as a collage (or mosaic or patchwork) from pixel patches excerpted from the style images. To a human observer, the stylized artwork is evocative of the style images, rather than the watermark signal (e.g., the background of FIG. 3 appears as a field of coffee beans). To a compliant digital watermark decoder, however, the stylized artwork is interpreted as a signal carrier, conveying an encoded plural-symbol payload. (Digital watermark decoders typically ignore low frequency image components that dominate human vision, and instead primarily decode signals from high frequency pattern variations that elude human eyes.)

The stylized image (sometimes termed a mixed image, or collage, or mosaic image) in a preferred embodiment is created by correlating blocks from the watermark signal image with blocks from the style image (a single style image is assumed for expository convenience). The style image block with the best correlation is substituted for the watermark signal block, for each of the watermark signal blocks. A watermarked pattern is thereby created without the conventional act of modulating pixels in a host image.

Since the resulting payload-conveying stylized image is a patchwork of the unmarked style image, typical watermarking signal visibility (steganography) criteria need not be considered. But a new visibility concern arises—edge discontinuity in the collage.

To reduce this concern, the watermark signal can be divided into relatively fewer blocks of larger size, reducing the number of adjoining edges in the resulting collage. As a practical matter, the selected size of the watermark signal blocks depends on attributes of the style image—particularly its spatial autocorrelation. If the style image has a very regular pattern, like parallel lines or a repetitive/tiled geometric pattern, it will have a high spatial autocorrelation and may not be suitable for creating a stylized watermark pattern. Other style images, with a bit less spatial autocorrelation, may be suitable, provided the blocks are small in size, e.g., with side dimensions of 1-3% of the side dimensions of the watermark signal image. Better are style images with less autocorrelation, in which case blocks having side dimensions on the order of 3-7% those of the watermark signal image can be used. Best, from an edge artifacts standpoint, are style images with very little autocorrelation, in which blocks having side dimensions on the order of 7-20% those of the watermark signal can be used. This last size produces the smallest number of edge continuities within the collage. (Put another way, style images with the highest translation entropy are generally preferred.)

FIG. 4 shows, on the left, a watermark signal image and a coffee bean image that was used as a style image, collectively yielding the collage shown on the right.

It will be recognized that there is a great deal of spatial repetition in the coffee bean pattern. That is, its autocorrelation is high. This requires small block sizes. One block is outlined in white in the collage image. The arrows point to the edge boundaries between adjoining blocks in the collage image—boundaries that can be discerned with careful inspection. (The horizontal edge boundaries are not particularly identified.) In this composite image there are 64 blocks. That is, each block occupies about 1.6% of the watermark signal image area.

Figures 5, 6:
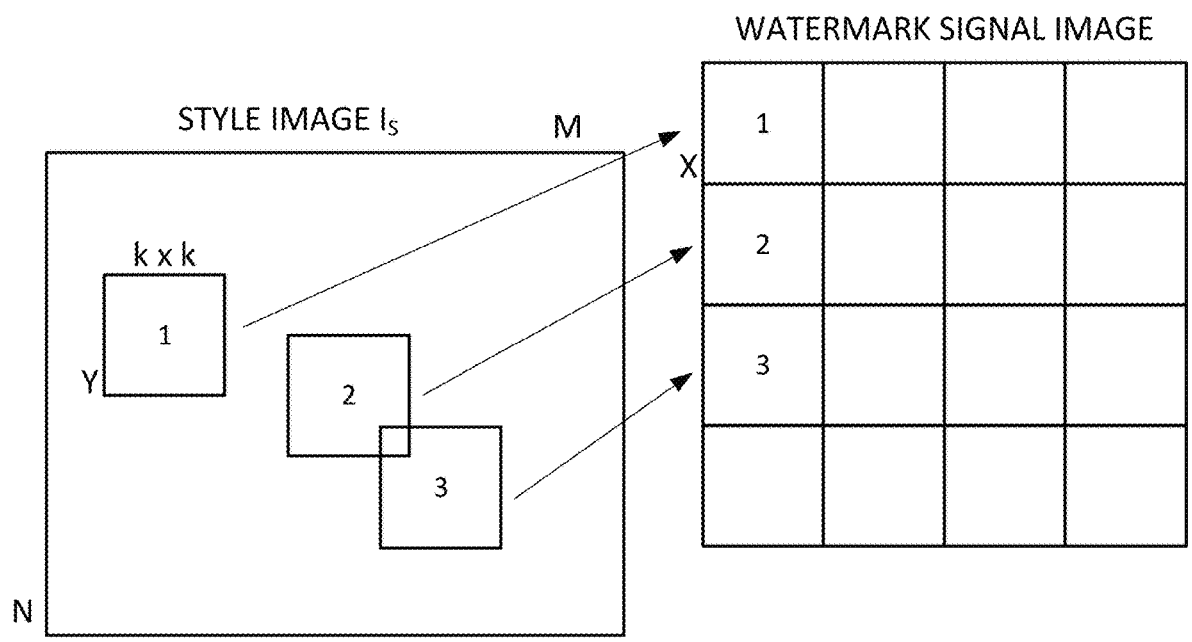
FIG. 5 schematically illustrates the selection of blocks from a style image to mimic a watermark pattern by a tiled collage.
FIG. 6 depicts a matrix operation employed in an illustrative embodiment of the present technology.

FIG. 5 conceptually shows the process. A regular array of blocks is identified within a watermark signal image. For each watermark signal block, a corresponding block is identified from within a style image, based on correlation, and copied to that position in the watermark signal image (or into a corresponding output image frame).

In a particular embodiment, the watermark signal image is divided into an array of k×k pixel blocks. Each of these is correlated against every k×k pixel excerpt within an N×M pixel style image, by a cross-correlation operation. For a k×k watermark signal block X, the cross-correlation operation with a single same-sized block Y in the style image can be expressed as:

$$x\text{corr}(X, Y) = \sum_{j=1}^{k}\sum_{i=1}^{k}(x_{ij} - m_x)(y_{ij} - m_y)$$

Where $m_x$ is the average value of the watermark signal block X, and $m_y$ is the average value of the style image block Y.

This double-summation expression can be rewritten as a matrix function B, as indicated by FIG. 6. Each column in this matrix is the vector of $k^2$ pixels $y=[y_{ij}-m_y]$ in each k×k block of the style image, where $m_y$ is the mean value of the pixels in that block. There are (M−k)(N−k) blocks of size k×k in the style image of size MN. Hence we obtain a matrix of size $k^2 \times (M-k)(N-k)$ by stacking all the vectors y as columns. (For large style images, we may prune the number of columns in the matrix B, by choosing a random sub sample of the columns up to a target number of columns.) Similarly, we create a vector $x=[x_{ij}-m_x]$ from the image block X in the watermark signal image.

From this matrix expression we may write:

$$x\,\text{corr}(X,Y)=x^T y,$$

a simple vector inner product operation.

Then the co-ordinates u, v of the block in the style image with the best correlation with the current watermark signal image block, out of all possible blocks in the style image, are given by:

$$\max_{u,v} x^T B.$$

The edge artifacts caused by tiling disparate blocks from the style image can be mitigated by considering edge continuity as a factor when selecting blocks from the style image.

Figure 7:
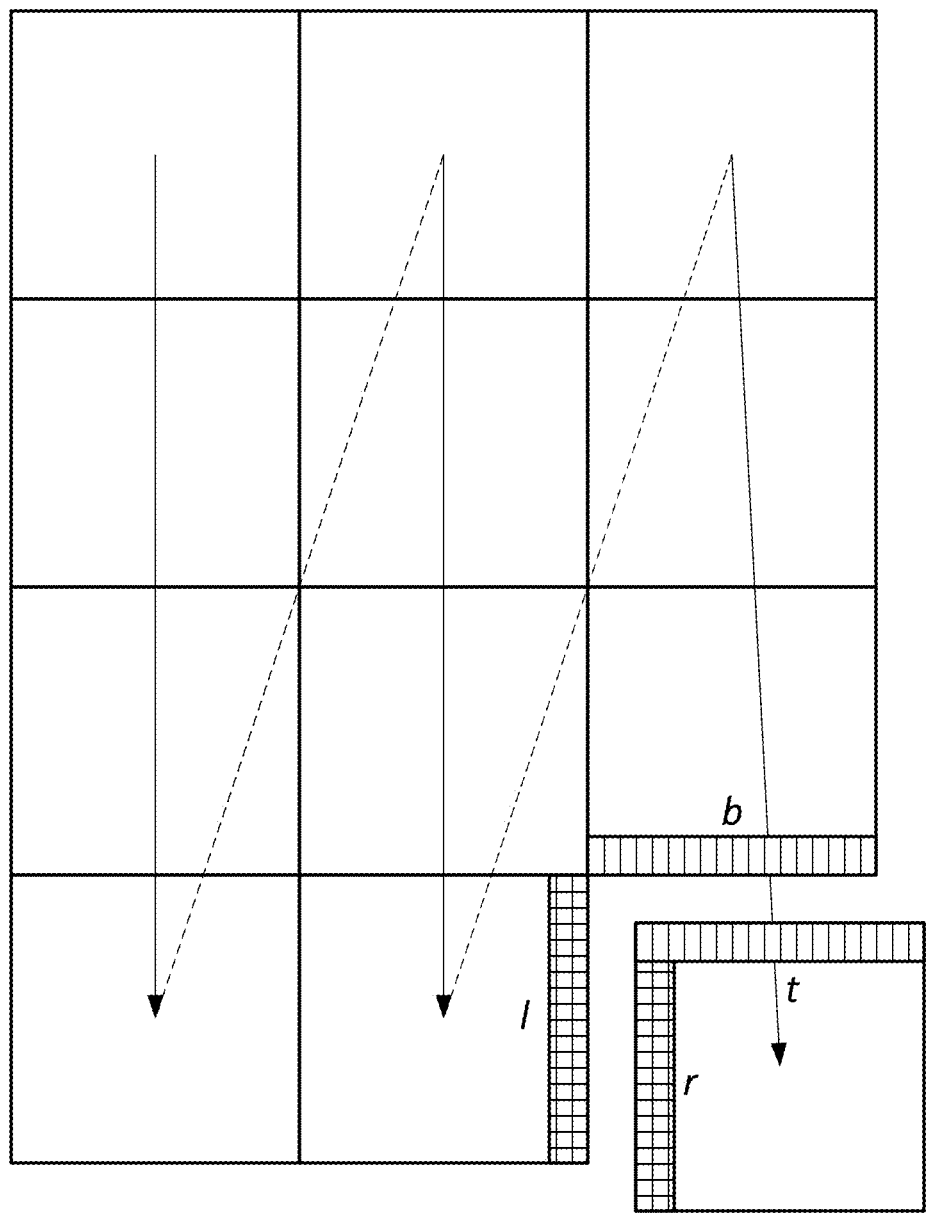
FIG. 7 is a diagram showing adjoining edges that are considered as each block is added to a tiled collage, so as to minimize edge discontinuities.

The arrows in FIG. 7 show a progression of adding blocks to the collage. To reduce edge discontinuities, a Total Variation (T.V.) metric can be employed, such as:

$$\text{T.V.}=\Sigma_{i=1}^{k}(|b_i-t_i|+|r_i-l_i|).$$

This factor evaluates congruence between the bottom edge ("b") edge of the previously-added style block above, and the top-edge ("t") of the style block under consideration, and similarly considers congruence between the right edge ("r") of a previously-added style block to the left, and the left edge ("l") of the style block under consideration. In particular, the absolute differences in pixel values along each of these two edges are summed.

(At the outer edges of the watermark signal image, where there is no adjoining block, we assume uniform pixel values of 127—mid-grey in a 0-255 pixel scale.)

To reduce edge artifacts, we want to minimize this T.V. metric, which is the same as maximizing its negative value. We thus combine the TV metric with the cross-correlation metric in a weighted sum to create a single metric for optimization:

$$\max_{u,v}\left[\alpha x^T B - \beta\left(\sum_{i=1}^{k}(|b_i - t_i| + |r_i - l_i|)\right)\right]$$

where $\alpha$ is a weighting factor for the correlation term, and $\beta$ is a weighting factor for the edge continuity term. Put another way, parameters $\alpha, \beta$ determine the signal strength and embedding smoothness, respectively.

The result does not change by multiplying both of the parameters by a common factor; only their ratio matters. For example, to get the most signal, but also the most discontinuous edges, the parameters can be set as $\alpha=1, \beta=0$. At the other extreme, with $\alpha=0, \beta=1$, there is nil watermark signal, but smooth edge transitions.

Figure 8A:
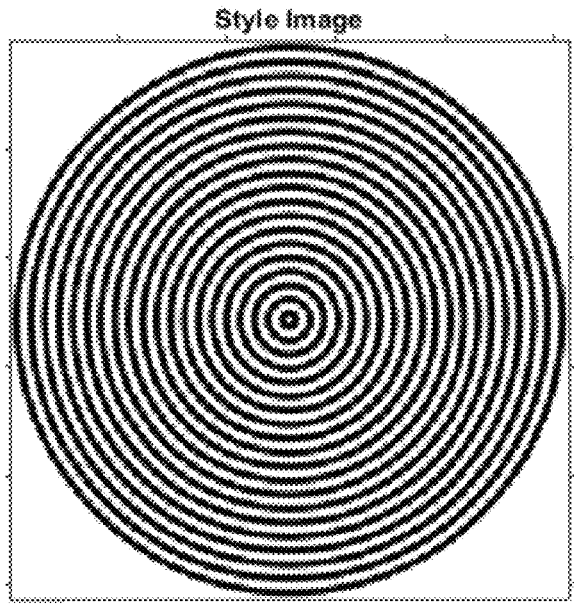
FIG. 8A shows a style image depicting concentric circles.
Figure 8B:
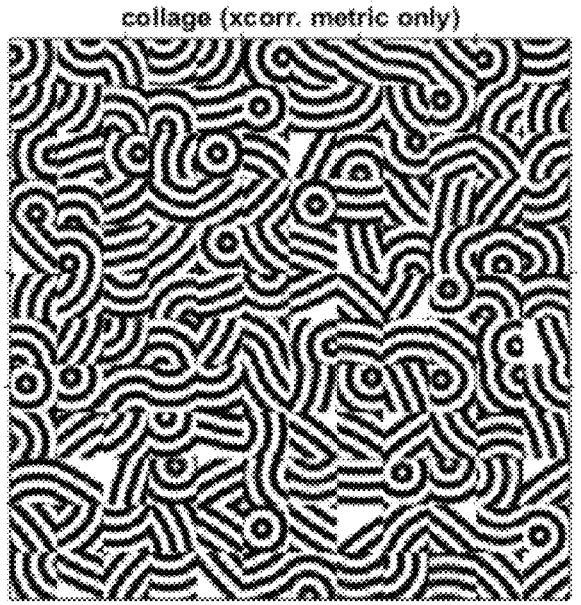
FIG. 8B shows a collage produced from the style image of FIG. 8A and a watermark image, considering block correlation, but without regard to edge artifacts.
Figure 8C:
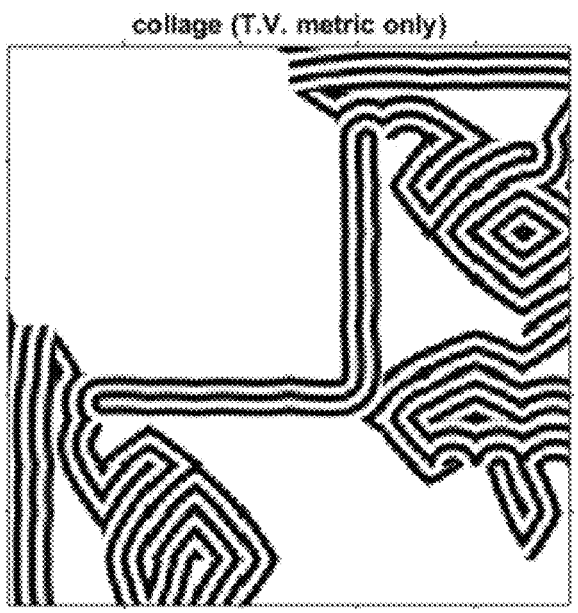
FIG. 8C shows a collage produced from the style image of FIG. 8A and a watermark image, minimizing edge discontinuities, but without regard to block correlation.
Figure 8D:
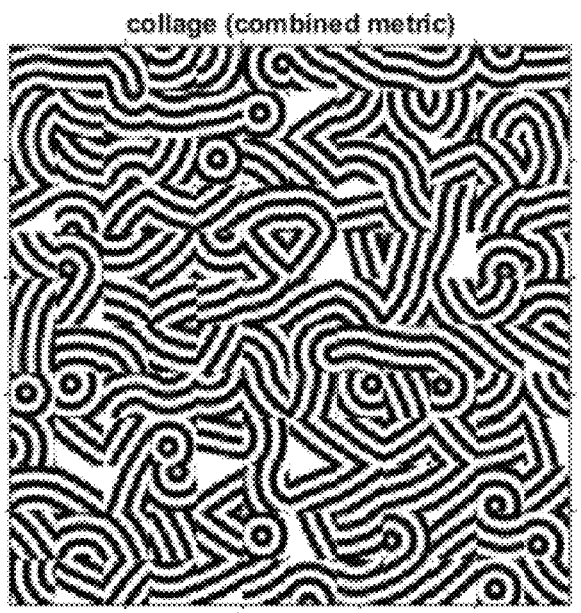
FIG. 8D shows a collage produced from the style image of FIG. 8A and a watermark image, which considers both block correlation and edge artifacts.

FIGS. 8A-8D illustrate. FIG. 8A shows a pattern of concentric circles, used as a style image. FIG. 8B shows a collage produced using excerpts taken from the concentric circles style image (and the watermark signal image of FIG. 4), when the correlation metric $\alpha=1$ and the Total Variation metric $\beta=0$. FIG. 8C shows the opposite case, when edge smoothness is exalted over signal strength ($\alpha=0, \beta=1$). FIG. 8D shows an intermediate state, in which parameters $\alpha, \beta$ both have non-zero values.

(One might expect FIG. 8C to match FIG. 8A, since FIG. 8A has the fewest edge artifacts. The FIG. 8C pattern is due, in part, to the block with which tiling started, and the fact that blocks are chosen based on continuity along only two edges—since the other two edges don't yet have blocks in place.)

Matlab code for producing the patterns of FIGS. 8B-8D is shown in FIG. 9A, which continues onto FIG. 9B. (The im2col function divides an image into blocks, converts each block to a vector, and creates a matrix by listing the vectors in columns.)

Figure 12:
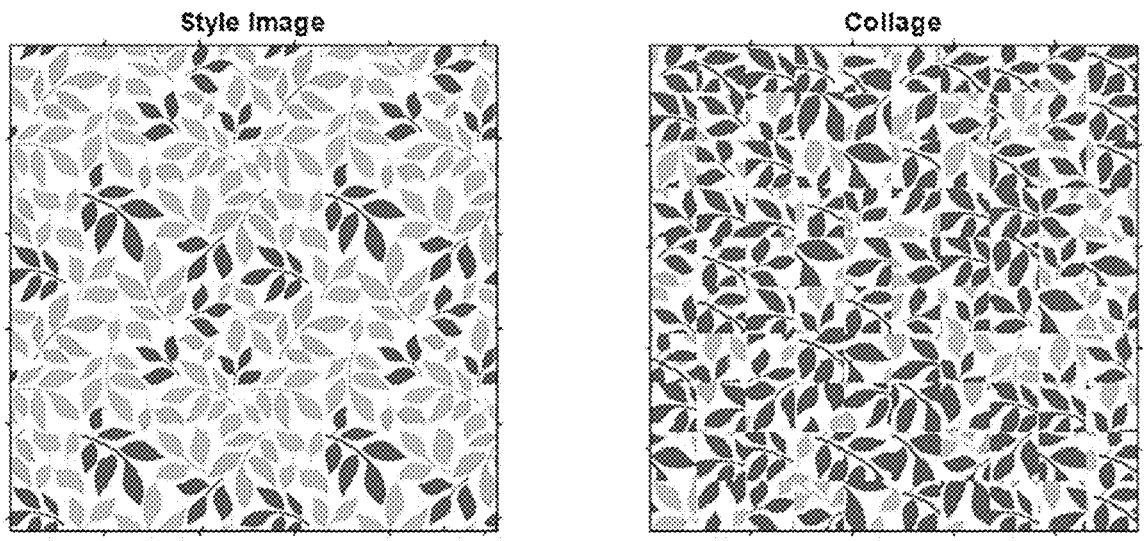
Figure 13:
FIG. 13 shows a further embodiment of the present technology.

FIGS. 10, 11 and 12 show other examples of the present technology—each with a style image on the left, and a resulting collage image on the right that mimics the watermark signal. FIG. 13 is similar to the collage of FIG. 11, but the synchronization marks of the original QR code used as a style image are maintained, to reinforce the visual association with a QR code. Each of collage images FIGS. 10-13, like the collage images of FIG. 4, FIGS. 8B and 8D, readily reads using the Digimarc Discover digital watermark detector, available from the Apple and Android app stores.

The collage images depicted in the present application read best when presented at a scale of about 100 waxels per inch or larger (e.g., 75 WPI). At such scale, the depicted collages are at least 1.28 inches on a side. Below this size their reading becomes less robust. (On the other hand, below this size, their artiness become less visible—reducing the appeal of using such stylized patterns.) Better robustness at smaller physical sizes may be aided by applying a low frequency boost to the watermark image prior to the block matching process.

If the style image is in RGB color, one particular embodiment converts the style image to a counterpart luminance image (e.g., using a RGB weighting of 0.21 R+0.72 G+0.07 B) for matching. That is, blocks from the watermark signal image are checked for correlation and edge congruence with greyscale blocks resulting from this conversion operation, to determine locations, within the style image, of the best-matching blocks. The original color image blocks from the thus-determined locations are then copied from the style image into the output frame to produce a color collage.

Applicants earlier referred to blocks having side lengths ranging from 1% to 20% of the watermark image side length. Blocks larger than 20% would theoretically be better but are statistically impractical.

An exemplary watermark tile comprises 16,384 waxels, arrayed in 128 columns and 128 rows. A block with side dimensions of 20% of such a tile has 25 rows and 25 columns, or 625 elements. (This assumes each watermark element is represented by a single pixel. Commonly, a "bump" comprising 4, 9 or 16 pixels is used.) Even with just two values, there are $2^{625}$ different 25×25 watermark blocks—a decimal number that is 188 digits in length. If the style image is regarded as a dictionary from which different blocks are taken to compose the mosaic, an ideal such dictionary would have a similar number of different blocks that could be excerpted. For a style image to have $10^{188}$ different 25×25 excerpts, it would need to have at least $10^{94}$ rows, and a like number of columns (assuming no 25×25 excerpt is repeated in such an image).

The situation is somewhat better with block sides measuring 10% of the watermark image sides. Such a block would be 13 pixels on a side, or 169 elements. Since each element may have two different values, there are $2^{169}$ different such blocks—a decimal number with 50 digits. For a style image to serve as a dictionary with this many different blocks, it would need to have at least $10^{25}$ rows, and a like number of columns.

Surprisingly, applicants found that image dictionaries (i.e., style images) of such sizes are not required. Due to data redundancies and the error correcting capabilities of coding used in an exemplary watermark, much much smaller, and much much more practical, style images can be used. The examples discussed herein employ style and watermark images measuring 256×256 pixels. If a 10% block size is used, each block is about 26 pixels on a side. There are 52,900 such blocks that can be excerpted from a 256×256 pixel style image (i.e., (256−26)*(256−26)), and this has been found to be generally adequate in most cases.

Roughly speaking, most typical applications of the technology (e.g., when mimicking watermark images having a 128×128 array of waxels, using blocks whose sides are at least 6% that of the watermark image) generally require a style image dictionary from which more than 10,000 different blocks can be drawn. A minimum dictionary size of 20,000 is better, and 40,000 or more is still better. The larger the dictionary, the more faithfully the collage can mimic the watermark signal image, and the more reliably such a collage will be readable by a digital watermark reader.

However, as the side length of the block increases, the size of the needed imagery dictionary increases exponentially. When the side length exceeds 20% of the watermark image dimension, there are typically not enough different style image blocks that can be excerpted to mimic the watermark image with the degree of fidelity needed to assure reliable watermark reading—at least with style images of practical size.

(At the other extreme, very small image dictionaries may be used. In the limiting case of a block having a size of one pixel, a dictionary of just a few differently-valued pixels, e.g., 32 or less, can suffice.)

The field of Photomosaic art, developed by Silvers (c.f. U.S. Pat. No. 6,137,498), seeks to mimic target artworks (e.g., famous portraits) in mosaic form, using other photos as mosaic elements. Such a mosaic, especially if seen from a distance or blurred (e.g., by a Gaussian filter), immediately evokes—to human viewers—the original target artwork. The present technology is different from Silvers' in a number of respects—perhaps foremost is that the resulting mosaic does not appear, to human viewers, like the target watermark signal. Rather, the resulting mosaic evokes, to human viewers, a visual impression from the style image. Put another way, if viewers are asked whether applicants' mosaic bears more resemblance to the style image or to the watermark image, nine viewers out of ten (or more) will respond saying it resembles the style image. See, e.g., FIG. 4.

This difference is due, in large part, to Silvers' concern with human perception, and applicants' concern with watermark decoding. Silvers tries to replicate an RGB image with full fidelity in the color space, to immediately evoke the target artwork to human viewers. Applicants are more concerned with faithfully reproducing pixel-scale gradients, and phases, in greyscale representation—the feature spaces on which steganographic watermark embedding and reading depend.

CONCLUDING REMARKS

Having described and illustrated certain features of the technology with reference to illustrative embodiments, it should be apparent that the invention is not so limited.

For example, there are many similarity and edge continuity metrics that can be employed; the detailed ones are exemplary only. For example, similarity may be determined using a metric based not on pixel values, but on divergences of pixel values from a local mean (e.g., a criss-cross kernel or 3×3 kernel). Edge continuity may be based on a sum of squared differences measure, instead of on a sum of differences measure. Other edge measures takes human visual system factors into account, factoring-in spatial-, contrast-, and color-sensitivity functions. Many other variants will be apparent to the artisan. To mitigate edge discontinuities, a raised cosine filter kernel can be applied along a band of pixels along one or both sides of the block junction, adjusting some or all such pixel values to effect a smoother transition—essentially blending the edges a bit.

Similarity may be determined by measures other than correlation. For example, a Euclidean distance may be computed between available style image blocks and a watermark signal block, and serve as a similarly measure. Likewise, the RMS block similarity measure employed by Silvers may be used with the present technology, in greyscale, if a large enough dictionary of different style image blocks is available.

It can be advantageous to apply oct-axis filtering to the style image and watermark signal blocks prior to determining similarity. Oct-axis filtering is familiar to digital watermarking artisans and is detailed, e.g., in U.S. Pat. Nos. 10,515,429 and 9,959,588. Thus, for example, the style and watermark signal blocks can each be oct-axis filtered, and then a Euclidean distance (similarity) measurement can be employed to compare blocks of the former with blocks of the latter. Relatedly, a correlation or Euclidean distance measurement can be based not on absolute pixel values, but rather on how far one pixel is from an image mean, versus how far a candidate-corresponding pixel is from the image mean. In correlation, such approach is commonly known as Pearson correlation.

In still other embodiments, a self-organizing map approach (aka Kohonen network) can be employed to determine block similarity. That is, a neural network can be trained, by unsupervised competitive learning, to produce a low dimensionality map through which similarity of style and watermark signal blocks can be assessed. (See, e.g., the literature of content-based image retrieval based on self-organizing maps, such as Guo, et al, Learning similarity measure for natural image retrieval with relevance feedback, IEEE Trans. on Neural Networks, Nov. 7, 2002, Vol. 13, No., 4, pp. 811-820; and Laaksonen, et al, Content-based image retrieval using self-organizing maps, Int'l Conf on Advances in Visual Information Systems, Jun. 2, 1999, pp. 541-549 (Springer).)

In one particular embodiment, a self-organizing map approach is employed to identify a glossary of 12 (or 16, or 30, etc.) different 4×4 greyscale patterns that, collectively, best-approximate the 1024 different 4×4 waxel sub-blocks that comprise a particular 128×128 signal tile. That is, this is the set of 12 patterns that can be composed to assemble an approximation of the signal tile having the smallest total error (e.g., by Euclidean distance measure), or the greatest correlation, with the original signal tile—as compared to any other set of 12 patterns.

Figure 14A:
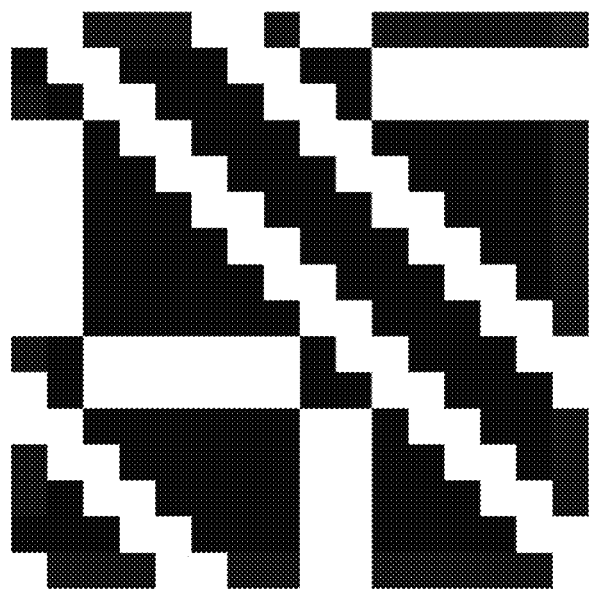
FIGS. 14A and 14B show two graphic embellishments, from a larger set, that can be composed to mimic a watermark signal tile.
Figure 14B:
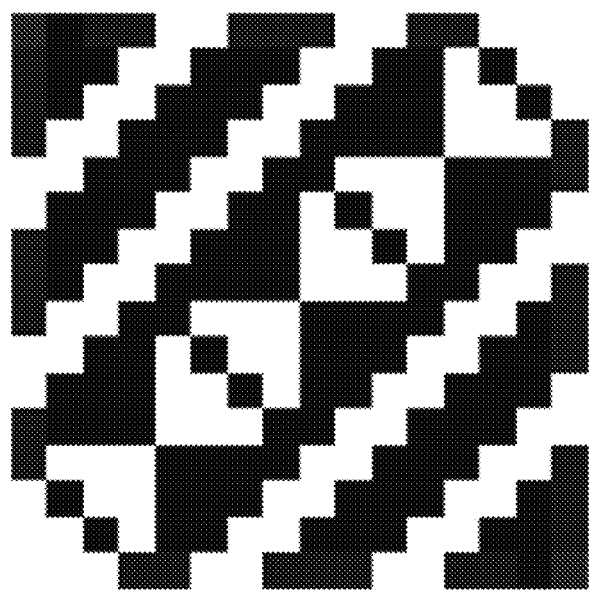

For each of these 12 4×4 base greyscale patterns, a corresponding graphical embellishment is created, correlated to the 4×4 pattern. The more correlation the better, although the redundancy of the signal tile is forgiving of errors. If a waxel is rendered as an array of 4×4 elements (i.e., the 128×128 waxel signal tile is rendered as a 512×512 array of print elements), then each of the base greyscale patterns would be rendered as 16×16 print elements, The corresponding graphical embellishment is thus defined to have a 16×16 element size. In some embodiments, each such embellishment is bintonal (e.g., black/white). FIGS. 14A and 14B illustrate two sample 16×16 graphical embellishments. (These examples are highly symmetric, but other embellishments need not have such quality.)

Each 4×4 waxel sub-block of the original signal tile is associated with one of the 12 base greyscale patterns, and each of these greyscale patterns is associated with one of the 12 graphic embellishments. Thus, the graphic embellishments are arrayed to mimic the original signal tile, with each embellishment typically substituting in place of several of the 4×4 waxel sub-blocks of the original signal tile.

Although there are multiple sources of signal error in such arrangement (e.g., the 12 base patterns serve, collectively, as rough proxies for 1024 4×4 waxel sub-blocks of the original signal tile, and the 12 graphic embellishments serve as a rough proxies for the 12 base patterns), the redundancy of the signal tile encoding nonetheless enables signal decoding.

In still further embodiments, block matching can employ the phase deviation approach detailed in U.S. Pat. Nos. 9,959,587 and 10,242,434.

The dictionary of image blocks available from the style image can be enlarged by considering the style image at different angular rotations, e.g., 90, 180 and 270 degrees—as well as at intermediate angles (with interpolation). Multiple style images can be employed, although in such situations is it typical for all to depict the same subject matter. An example is to take a style image and scale it by 3%. The scaled image will provide excerpts with a new, different, set of statistics, which may provide better matches with certain blocks from the watermark image.

As is evident from FIG. 8D, certain pixel patches from the style image may be used multiple times within a single collage. (See, e.g., the multiple uses of the bullseye copied from the center of the style image.)

While the detailed arrangement assembles a collage from blocks placed edge-to-edge, this is not essential. For example, in one alternative embodiment, blocks are overlapped and gaussian-weighted, with a maximum weight at the block center, and tapering towards the edges. Overlapping pixels from two or more blocks can be averaged in accordance with their respective weights.

While the detailed arrangement employs square blocks, this is not essential. For example, the excerpts matched between the watermark image and the style image may be rectangular in shape, e.g., patches that are 4×16 (or 4×32) pixels in size.

As noted, a particular application of the technology is in marking food packaging with watermarked identifiers, without the challenges of keeping the watermark pattern below a threshold of visual perceptibility when rendered on a particular printing press. Instead, the pattern is made plainly visible; it serves as a deliberate component of package artwork—one that contributes to, rather than detracts from, package aesthetics. In this context, applicants have found that images of fruits, nuts, seeds, grains, beans, and other food items (e.g., gumballs), often serve as suitable style images. Likewise, geometrical patterns are another class of frequently-suitable watermark style images for food packaging.

Although the technology is illustrated with reference to digital watermark technology, the principles are similarly applicable to other machine readable codes/symbologies.

The processes and arrangements disclosed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC). Additional details concerning special purpose electronic circuitry are provided in U.S. Pat. No. 9,819,950.

Software instructions for implementing the detailed functionality can be authored by artisans without undue experimentation from the descriptions provided herein, e.g., written in C, C++, Visual Basic, Java, Python, Tcl, Perl, Scheme, Ruby, Matlab, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Details concerning watermarking included in embodiments of the present technology are disclosed in Digimarc's previous patent filings, including U.S. Pat. Nos. 6,122,403, 6,590,996, 6,614,914, 6,975,744, 9,747,656, 9,959,587, 10,242,434, 20170024840, and 20160364623, and pending application Ser. No. 16/002,989, filed Jun. 7, 2018 (published as 20190171856), Ser. No. 16/141,587, filed Sep. 25, 2018 (published as 20190266749), and PCT/US19/19410, filed Feb. 25, 2019 (published as WO/2019/165364). Again, artisans are presumed to be familiar with such art.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicants similarly recognize and intend that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicants' inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicants incorporates-by-reference each of the documents referenced herein. (Such materials are incorporated in their entireties, even if cited above in connection with specific of their teachings.) These references disclose technologies and teachings that applicants intend be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A method of creating a stylized counterpart to a target image, the target image comprising a 2D machine-readable code, the target image having an attribute of being decodable by a compliant reader apparatus to produce a plural-symbol payload earlier encoded therein, the method comprising the acts:

(a) identifying component blocks of the target image, each component block having a respective location within said target image, wherein an array of P of said component blocks collectively forms a pattern that spans the target image, in which P comprises a positive integer;

(b) receiving one or more style images;
(c) performing a similarity comparison between a first of said component blocks of the target image, and plural candidate excerpts within the one or more style images, yielding a set of similarity values—each corresponding to a respective candidate excerpt within a style image;
(d) selecting one of said candidate excerpts, based at least in part on its corresponding similarity value;
(e) copying the selected candidate excerpt into a location in an output frame that corresponds to the location of the first component block within the target image; and
(f) repeating acts (c) through (e) for second through Pth component blocks of the target image;
wherein the output frame is filled with selected excerpts from one or more style images, yielding a stylized counterpart image having said attribute of being decodable by said compliant reader apparatus to produce said plural-symbol payload.

2. The method of claim 1 that further includes computing at least one edge similarity metric between a candidate excerpt within the one or more style images, and a previously-selected excerpt, wherein the selecting act is based in part on said edge similarity metric.

3. The method of claim 1 in which the stylized counterpart image evokes, to a majority of human viewers, a visual impression of the style image rather than a visual impression of the target image.

4. The method of claim 1 in which the target image comprises an artwork in which a digital watermark has been inserted.

5. The method of claim 1 in which at least one of said selected candidate excerpts is larger than the component block of the target image to which it corresponds.

6. The method of claim 1 in which all of the candidate excerpts are subsets of a single style image.

7. The method of claim 6 in which the single style image comprises an image of a QR code.

8. The method of claim 6 in which:
each of the candidate excerpts is I×J pixels in size, in which I and J are both positive integers;
the single style image is U×V pixels in size, in which U and V are both positive integers; and
act (c) includes performing a similarity comparison that compares the first of said component blocks of the target image with every different I by J pixel excerpt within the style image, yielding (U−I+1)*(V−J+1) similarity values in said set.

9. The method of claim 1 in which two of said candidate excerpts are taken from a single style image, and overlap in the style image, so said two candidate excerpts have a patch of plural pixels in common.

10. The method of claim 1 in which two of said selected excerpts are taken from a single image, and overlap, so said two selected excerpts have a patch of plural pixels in common.

11. The method of claim 1 in which a selected excerpt appears at two spaced-apart locations within the output frame.

12. The method of claim 1 in which a component block has a side dimension that is between 1-3% of a side dimension of the target image.

13. The method of claim 1 in which a component block has a side dimension that is between 3-7% of a side dimension of the target image.

14. The method of claim 1 in which a component block has a side dimension that is between 7-20% of a side dimension of the target image.

15. The method of claim 1 in which the similarity comparison of act (c) comprises a correlation operation.

16. The method of claim 15 in which act (c) includes performing a cross-correlation operation between the first of said component blocks and a style image, yielding said set of correlation values.

17. The method of claim 1 in which the similarity comparison of act (c) comprises evaluating a Euclidean distance measurement.

18. The method of claim 1 in which the similarity comparison of act (c) comprises evaluating a Euclidean distance measurement between oct-axis filtered counterparts of the target and style images. 19-35. canceled.

19. The method of claim 1 that includes printing the stylized counterpart image on a plastic food container using dry offset printing.

20. A non-transitory computer readable medium comprising instructions stored thereon that, when executed by one or more processors of a computer system, cause the computer system to perform operations comprising:
(a) identifying component blocks of a target image, the target image comprising a 2D machine-readable code, the target image having an attribute of being decodable by a compliant reader apparatus to produce a plural-symbol payload earlier encoded therein, each component block having a respective location within said target image, wherein an array of P of said component blocks collectively forms a pattern that spans the target image, in which P comprises a positive integer;
(b) receiving one or more style images;
(c) performing a similarity comparison between a first of said component blocks of the target image, and plural candidate excerpts within the one or more style images, yielding a set of similarity values—each corresponding to a respective candidate excerpt within a style image;
(d) selecting one of the candidate excerpts, based at least in part on its corresponding similarity value;
(e) copying the selected candidate excerpt into a location in an output frame that corresponds to the location of the first component block within the target image; and
(f) repeating operations (c) through (e) for second through Pth component blocks of the target image;
wherein the output frame is filled with selected excerpts from one or more style images, yielding a stylized counterpart image of the target image, the stylized counterpart image having the attribute of being decodable by the compliant reader apparatus to produce the plural-symbol payload.

21. The non-transitory computer readable medium of claim 20 further including instructions that, when executed by the one or more processors of the computer system, cause the computer system to perform an operation comprising:
computing at least one edge similarity metric between a candidate excerpt within the one or more style images, and a previously-selected excerpt, wherein the selecting operation is based in part on said edge similarity metric.

22. The non-transitory computer readable medium of claim 20 in which the stylized counterpart image evokes, to a majority of human viewers, a visual impression of the style image rather than a visual impression of the target image.

23. The non-transitory computer readable medium of claim 20 in which the target image comprises an artwork in which a digital watermark has been inserted.

24. The non-transitory computer readable medium of claim 20 in which at least one of said selected candidate excerpts is larger than the component block of the target image to which it corresponds.

25. The non-transitory computer readable medium of claim 20 in which all of the candidate excerpts are subsets of a single style image.

26. The non-transitory computer readable medium of claim 25, in which the single style image comprises an image of a QR code.

27. The non-transitory computer readable medium of claim 25, in which:
   each of the candidate excerpts is I×J pixels in size, in which I and J are both positive integers;
   the single style image is U×V pixels in size, in which U and V are both positive integers; and
   operation (c) includes performing a similarity comparison that compares the first of said component blocks of the target image with every different I by J pixel excerpt within the style image, yielding (U−I+1) * (V−J+1) similarity values in said set.

28. The non-transitory computer readable medium of claim 20, in which two of said candidate excerpts are taken from a single style image, and overlap in the style image, so said two candidate excerpts have a patch of plural pixels in common.

29. The non-transitory computer readable medium of claim 20, in which two of said selected excerpts are taken from a single image, and overlap, so said two selected excerpts have a patch of plural pixels in common.

30. The non-transitory computer readable medium of claim 20, in which a selected excerpt appears at two spaced-apart locations within the output frame.

31. The non-transitory computer readable medium of claim 20, in which a component block has a side dimension that is between 1-3% of a side dimension of the target image.

32. The non-transitory computer readable medium of claim 20, in which a component block has a side dimension that is between 3-7% of a side dimension of the target image.

33. The non-transitory computer readable medium of claim 20, in which a component block has a side dimension that is between 7-20% of a side dimension of the target image.

34. The non-transitory computer readable medium of claim 20, in which the similarity comparison of operation (c) comprises a correlation operation.

35. The non-transitory computer readable medium of claim 34, in which operation (c) includes performing a cross-correlation operation between the first of said component blocks and a style image, yielding said set of correlation values.

36. The non-transitory computer readable medium of claim 20, in which the similarity comparison of operation (c) comprises evaluating a Euclidean distance measurement.

37. The non-transitory computer readable medium of claim 20, in which the similarity comparison of operation (c) comprises evaluating a Euclidean distance measurement between oct-axis filtered counterparts of the target and style images.

38. An apparatus comprising:
   memory storing: i) a target image comprising a 2D machine-readable code, the target image having an attribute of being decodable by a compliant reader apparatus to produce a plural-symbol payload earlier encoded therein, each component block having a respective location within said target image, and ii) one or more style images;

(a) means for identifying component blocks of a target image, wherein an array of P of said component blocks collectively forms a pattern that spans the target image, in which P comprises a positive integer;
   (b) means for performing a similarity comparison between a first of the component blocks of the target image, and plural candidate excerpts within the one or more style images, yielding a set of similarity values—each corresponding to a respective candidate excerpt within a style image;
   (c) means for selecting one of the candidate excerpts, based at least in part on its corresponding similarity value;
   (d) means for copying the selected candidate excerpt into a location in an output frame that corresponds to the location of the first component block within the target image; and
   (e) means for re-executing the means of (b) through (d) for second through Pth component blocks of the target image;
   means for filling the output frame with selected excerpts from one or more style images, yielding a stylized counterpart image of the target image, the stylized counterpart image having the attribute of being decodable by the compliant reader apparatus to produce the plural-symbol payload.

39. The apparatus of claim 38 further comprising: means for determining at least one edge similarity metric between a candidate excerpt within the one or more style images, and a previously-selected excerpt, wherein said means for selecting utilizes the at least one edge similarity metric.

40. The apparatus of claim 38, in which:
   each of the candidate excerpts is I×J pixels in size, in which I and J are both positive integers;
   the single style image is U×V pixels in size, in which U and V are both positive integers; and
   said means for performing a similarity comparison utilizes a similarity comparison that compares the first of the component blocks of the target image with every different I by J pixel excerpt within the style image, yielding (U−I+1) * (V−J+1) similarity values in the set of similarity values.

41. The apparatus of claim 38, in which two of the candidate excerpts are taken from a single style image, and overlap in the style image, so said two candidate excerpts have a patch of plural pixels in common.

42. The apparatus of claim 38, in which two of the selected excerpts are taken from a single image, and overlap, so the two selected excerpts have a patch of plural pixels in common.

43. The system of claim 38 in which means for performing a similarity comparison (b) executes a correlation operation.

44. The system of claim 43 in which means for performing a similarity comparison (b) executes a cross-correlation operation between the first of the component blocks and a style image, yielding the set of correlation values.

45. The system of claim 38 in which means for performing a similarity comparison (b) executes an evaluation a Euclidean distance measurement between oct-axis filtered counterparts of the target image and the style image.

* * * * *